Figure 1:
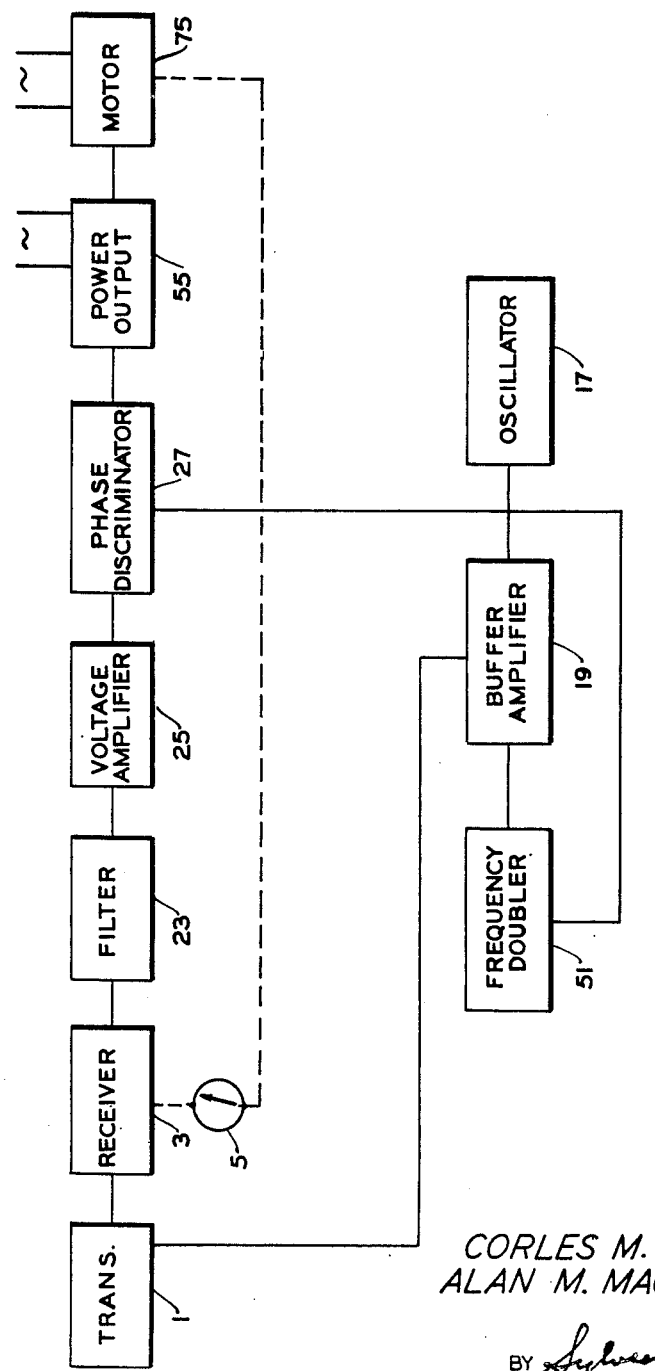

March 31, 1953  C. M. PERKINS ET AL  2,633,559
COMPASS SYSTEM

Filed July 1, 1949  2 SHEETS—SHEET 1

INVENTORS
CORLES M. PERKINS
ALAN M. MAC CALLUM
BY Sylvester Hartz
ATTORNEY

March 31, 1953   C. M. PERKINS ET AL   2,633,559
COMPASS SYSTEM
Filed July 1, 1949
2 SHEETS—SHEET 2

INVENTORS
CORLES M. PERKINS
ALAN M. MAC CALLUM
BY Sylvester Hartz
ATTORNEY

Patented Mar. 31, 1953

2,633,559

UNITED STATES PATENT OFFICE 2,633,559

COMPASS SYSTEM

Corles M. Perkins, Rutherford, and Alan M. Mac-Calium, Maywood, N. J., assignors to Bendix Aviation Corporation, Teterboro, N. J., a corporation of Delaware Application July 1, 1949, Serial No. 102,672

9 Claims. (Cl. 318—30)

The invention relates to magnetic compasses for use on moving craft and more particularly to earth inductor compasses for remotely indicating the direction of the earth's magnetic field.

Earth inductor compass systems used heretofore have an excited transmitter inductive device positioned in the earth's magnetic field, and a receiver inductive device cooperating therewith for generating a signal voltage having a frequency primarily twice the frequency of the exciting voltage. The signal voltage is amplified and impressed on the variable phase of a two-phase motor mechanically connected to the receiver for driving the receiver to null position, that is, until the signal voltage is zero.

It is desirable to minimize interference between the signal voltage and power voltage by using signal frequencies having values greatly different from the power frequency and not a harmonic of the power frequency. In the system described above, the maximum exciting voltage frequency which can be used is limited by the motor which will not operate on frequencies greatly in excess of twice the power frequency. In an attempt to minimize interference between the power frequency and signal frequency, an exciting voltage having a frequency of 487.5 cycles per second, and a power voltage having a frequency of 400 cycles per second, were used. Because of space limitations in the compass system, with the signal frequency and power frequency so closely related, the power frequency modulates the signal frequency and interferes with accurate response of the motor.

Also, the compass system described above has one oscillator to produce the exciting voltage frequency and a second oscillator to produce a voltage frequency twice that of the exciting voltage frequency for energizing the fixed motor phase. This circuit arrangement was relatively expensive and unsatisfactory because the oscillators had to be sharply tuned relative to one another to provide the desired voltage frequencies.

It has been found by tests that the amplitude of the signal of the receiver for a given movement of the transmitter relative to the earth's magnetic field increases as the excitation frequency increases. However, the maximum practical frequency is limited in the conventional system because the signal is transmitted over open low-frequency wiring. Also, amplifier construction is more complicated at the higher frequencies.

One object of the present invention is to use an exciting voltage frequency in an earth inductor compass system substantially higher than the frequencies used heretofore and substantially higher than the power frequencies to reduce interference from power frequencies and to increase the amplitude of the signals.

Another object is to use the second harmonic of a relatively high exciting voltage frequency to provide a signal for transmission over open low-frequency wiring and without complicating the system.

Another object is to separately excite the motor from a low frequency power source and to control operation of the motor by means responsive to the high frequency signals.

Another object is to supply a voltage for phase discrimination against the signal and having a frequency the same as the signal, that is, twice the frequency of the exciting voltage, by providing a frequency doubler for doubling the frequency of the exciting voltage and without the use of a separate oscillator.

Another object is to provide an earth inductor compass system which is more accurate, rugged and reliable and less expensive and no larger in size than corresponding systems used heretofore.

The invention contemplates an earth inductor compass system having transmitter and receiver inductive devices, the former being excited by an oscillator producing a voltage having a frequency greatly in excess of the power frequency and preferably at least 10 times the frequency of the power frequency. The signal is amplified and fed to a phase discriminator where its phase is discriminated against the phase of a voltage of the same frequency as the signal frequency generated by a frequency doubler connected to the oscillator. The discriminator output controls a voltage from the power source impressed on a motor connected mechanically to the receiver.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration and description only, and are not to be construed as defining the limits of the invention.

Figure 2:
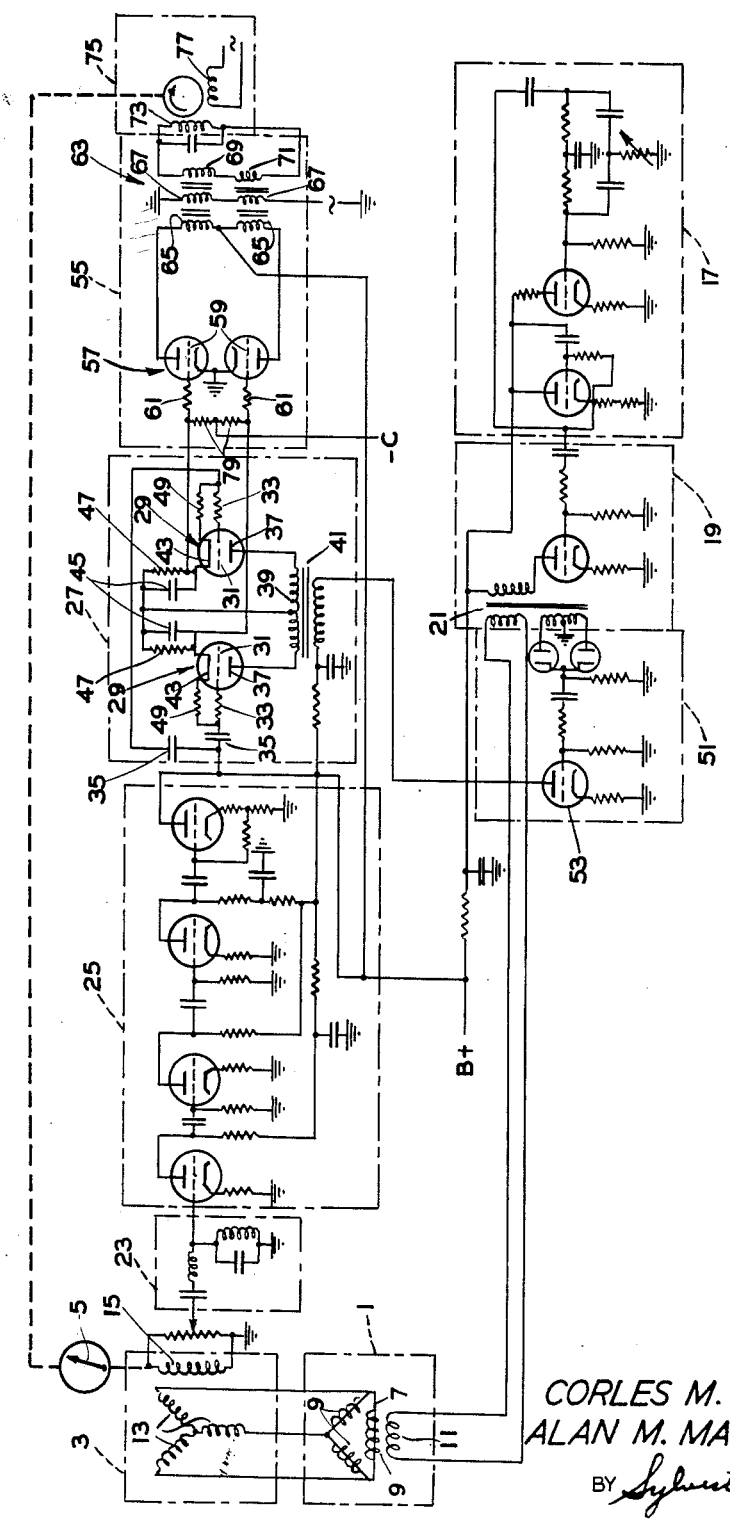

In the drawings, Figure 1 is a schematic block diagram showing one embodiment of the invention, and Figure 2 is a schematic wiring diagram showing the embodiment of Figure 1.

The compass system includes a transmitter inductive device 1 and a receiver inductive device 3 having a rotating index 5 to indicate the direction of the earth's magnetic field. Transmitter 1 has a triangular core 7 of highly permeable alloy provided with pickup windings 9 and an excited winding 11. Transmitter 1 may be stabilized in a horizontal plane by a horizon gyroscope (not shown).

Receiver 3 has stator windings 13 connected electrically to pickup windings 9 and a rotor winding 15 connected mechanically to index 5.

A resistance capacitance tuned oscillator 17 produces a voltage frequency of approximately 5 kilocycles per second, and this voltage is fed to a buffer amplifier 19. Winding 11 is connected to buffer amplifier 19 through a transformer 21 and is excited by the amplified voltage from the buffer amplifier.

When the direction of the craft changes and the transmitter moves angularly in azimuth, pulsating signal voltages develop in pickup windings 9 and their relative amplitudes are determined by the position of core 7 relative to the earth's magnetic field. The signal voltages generated in the pickup windings by the earth's magnetic field are reproduced in receiver stator windings 13, and a single phase signal voltage is induced in rotor winding 15 when the latter is not in agreement with the position of transmitter core 7. By agreement between rotor winding 15 and transmitter core 7 is meant that rotor winding 15 is aligned with, or is in non-inductive relation to, the direction of the maximum resultant field produced by stator windings 13. The amplitude and phase of the single phase signal voltage is proportional to the angle and direction of rotation of rotor 15 relative to its agreement with the position of transmitter core 7.

The frequency of the single phase signal voltage of rotor winding 15 is primarily the second harmonic of the exciting frequency, that is, approximately ten kilocycles per second, but includes many other frequencies including the fundamental and its harmonics.

The single phase signal voltage from receiver rotor 15 is passed through a band-pass 23 which may be of the conventional inductance-capacitance type. The filter passes the desired second harmonic signal and attenuates undesirable frequencies. The filtered signal is fed to the input stage of a four-stage amplifier 25 and the amplified voltage from the final stage of the amplifier is impressed on a phase discriminator 27 which may be of the kind described in co-pending application Serial No. 36,736, filed July 2, 1948 by the present applicants, and assigned to the same assignee as the present application. The function of the phase discriminator is to compare the relative phases of the exciting voltage and the signal voltage.

Phase discriminator 27 includes a pair of tubes 29 having their grids 31 connected through resistors 33 and condensers 35 to the final stage of amplifier 25. Plates 37 of tubes 29 are connected to the ends of a secondary winding 39 of a transformer 41, and cathodes 43 of tubes 29 are connected to the midpoint of secondary winding 39 through condensers 45 and resistors 47 in parallel. Cathodes 43 also are connected through resistors 49, 33 in series to grids 31.

Phase discriminator 27 is connected through transformer 41 to a frequency doubler rectifier 51 which is connected to buffer amplifier 19 through transformer 21. The voltage from the frequency doubler rectifier 51 is in phase with the exciting voltage from oscillator 17 and its frequency is the same as the frequency of the signal voltage. The voltage from the frequency doubler rectifier 51 may be filtered if desired to eliminate undesirable frequencies and the filtered voltage may be amplified to any desired magnitude. In the present arrangement, a single-stage amplifier 53 is provided.

The signals from phase discriminator 27 are fed to a power output amplifier 55 including a current amplifier 57, having its tube grids 59 connected to cathodes 43 through resistors 61, and including a magnetic amplifier 63 having its saturating windings 65 connected in series with the plate-cathode circuits of current amplifier 57. Primary windings 67 of magnetic amplifier 63 are connected to an alternating power source of relatively low frequency (approximately 400 cycles per second) and secondary windings 69, 71 oppose one another and are connected in series with the variable phase 73 of a two-phase motor 75 mechanically connected to rotor winding 15 and index 5 to drive the rotor to agreement. The fixed phase 77 of motor 75 is connected directly to the low frequency power source.

As the potentials of cathodes 43 of phase discriminator 27 change relative to one another as determined by the signal voltages, current will flow through one or the other of saturating windings 65 to reduce the effectiveness of the associated primary and secondary windings and provide for current flow through the secondary windings so that motor 75 operates in one direction or the other.

Grids 59 of current amplifier 57 preferably are biased through resistors 79 so that no current flows in the plate circuit in the absence of signals from phase discriminator 27 as will occur when rotor winding 15 is in agreement with the position of transmitter 1.

The compass system described herein effectively reduces interference from power frequencies and provides a signal of substantial amplitude by using an exciting voltage frequency substantially higher than the power frequency. The motor is separately excited from a low frequency power source and operation of the motor is controlled by means responsive to the high frequency signals. The frequency doubler rectifier supplies a voltage having the same frequency as the signal voltage, and without using a separate oscillator. Finally, the compass system described herein is accurate, rugged and reliable, relatively inexpensive and compact.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an earth inductor compass, a transmitter inductive device, an oscillator producing a voltage having a relatively high frequency to excite said transmitter inductive device, a receiver induuctive device associated with said transmitter inductive device and producing a signal voltage having twice the frequency of the exciting voltage when in disagreement therewith, a frequency doubler rectifier responsive to the exciting voltage frequency from said oscillator and producing a voltage having the same frequency as the signal voltage frequency, a phase discriminator receiving the signal voltage and the frequency doubler rectifier voltage and discriminating between the phases of the voltages, a motor connected electrically to a power source of a frequency substantially lower than the frequency of the exciting voltage and arranged to return said receiver inductive device to agreement with said transmitter inductive device, and means responsive to the output of said phase discriminator for controlling operation of said motor.

2. In an earth inductor compass, a transmitter inductive device, an oscillator exciting said transmitter inductive device, a receiver inductive device associated with said transmitter inductive device and producing a signal voltage having twice the frequency of the exciting voltage when in disagreement with said transmitter inductive device, a phase discriminator, a frequency doubler rectifier responsive to the exciting voltage frequency from said oscillator and producing a voltage having double the frequency of said oscillator voltage frequency, means to feed the signal voltage and the double frequency voltage to said phase discriminator, a motor connected electrically to a power source having a frequency substantially lower than the frequency of the exciting voltage and connected mechanically to said receive inductive device to drive said receiver inductive device to agreement with said transmitter inductive device, and means responsive to the output of said phase discriminator for controlling operation of said motor.

3. In an earth inductor compass, a transmitter inductive device, an oscillator producing a voltage having a frequency of approximately five kilocycles per second to excite said transmitter inductive device, a receiver inductive device associated with said transmitter inductive device and producing a signal voltage having a frequency twice the exciting frequency when in disagreement with said transmitter inductive device, a frequency doubler rectifier responsive to the exciting voltage frequency from said oscillator and producing a voltage having a frequency the same as the signal voltage frequency, a phase discriminator receiving the signal voltage and the frequency doubler rectifier voltage and discriminating between the phases of the voltages, a motor connected electrically to a power source having a frequency of less than one kilocycle per second and arranged to return said receiver inductive device to agreement with said transmitter inductive device, and means responsive to the output of said phase discriminator for controlling operation of said motor.

4. In an earth inductor compass, a transmitter inductive device, an oscillator for exciting said transmitter inductive device, a receiver inductive device associated with said transmitter inductive device and producing a signal voltage having twice the frequency of the exciting voltage when in disagreement with said transmitter inductive device, an amplifier connected to said receiver inductive device and amplifying the signal from said receiver inductive device, a frequency doubler rectifier responsive to the exciting voltage frequency from said oscillator and producing a voltage having double the frequency of the oscillator voltage frequency, a phase discriminator connected to said amplifier and to said frequency doubler rectifier and discriminating between the phases of the signal voltage and the double frequency voltage, a motor connected electrically to a power source having a frequency substantially lower than the frequency of the exciting voltage and connected mechanically to said receiver inductive device to drive said receiver inductive device to agreement with said transmitter inductive device, and means responsive to the output of said phase discriminator for controlling operation of said motor.

5. In an earth inductor compass, a transmitter inductive device, an oscillator for exciting said transmitter inductive device, a receiver inductive device associated with said transmitter inductive device and adapted to generate a signal voltage when in disagreement therewith, a filter receiving the signal voltage and passing a component of the signal voltage having a frequency twice the frequency of the exciting voltage, an amplifier connected to said filter for amplifying the filtered signal from said receiver, a frequency doubler rectifier responsive to the exciting voltage frequency from said oscillator and producing a voltage having the same frequency as said filtered signal voltage, a phase discriminator connected to said amplifier and to said frequency doubler rectifier for discriminating the phase of the signal voltage against the phase of the rectifier voltage, a motor connected electrically to a power source having a frequency substantially lower than the frequency of the exciting voltage and connected mechanically to said receiver inductive device to drive said receiver inductive device to agreement with said transmitter inductive device, and a magnetic amplifier responsive to the output of said phase discriminator and connecting said motor to said power source and controlling operation of said motor.

6. In an earth inductor compass, a transmitter inductive device, an oscillator producing a voltage having a frequency of approximately five kilocycles per second to excite said transmitter inductive device, a receiver inductive device associated with said transmitter inductive device and producing a signal voltage of a frequency of approximately ten kilocycles per second when in disagreement therewith, an amplifier connected to the receiver for amplifying the signal voltage from said receiver, a frequency doubler rectifier responsive to the exciting voltage frequency from said oscillator and producing a voltage having the same frequency as said signal voltage frequency, a phase discriminator receiving the amplified signal voltage and the frequency doubler rectifier voltage and discriminating between the phases of the voltages, a motor connected electrically to a power source having a frequency of less than one kilocycle per second and connected mechanically to said receiver inductive device to drive said receiver inductive device to agreement with said transmitter inductive device, and means responsive to the output of said phase discriminator for controlling operation of said motor.

7. In an earth inductor compass, a motor connected electrically to a relatively low frequency power source, a transmitter inductive device, an oscillator producing a voltage having a frequency of at least ten times the frequency of said power source to excite said transmitter inductive device, a receiver inductive device associated with said transmitter inductive device and producing a signal voltage of a frequency twice the frequency of the exciting voltage when in disagreement with said transmitter inductive device, an amplifier receiving and amplifying the signal from said receiver inductive device, a frequency doubler rectifier responsive to the exciting voltage frequency from said oscillator and producing a voltage having double the frequency of said oscillator voltage frequency, a phase discriminator receiving the amplified signal voltage and the double frequency voltage and discriminating between the phases of the voltages, and means responsive to the output of said phase discriminator for controlling operation of said motor, said motor being connected mechanically to said receiver inductive device to drive said receiver inductive device to agreement with said transmitter inductive device.

8. In an earth inductor compass, a transmitter inductive device, an oscillator producing a voltage having a relatively high frequency, a buffer amplifier connected to said oscillator and to said transmitter inductive device and exciting said transmitter inductive device with the oscillator voltage, a receiver inductive device associated with said transmitter inductive device and adapted to generate a signal voltage having a frequency of primarily twice the frequency of the oscillator frequency, a filter connected to said receiver inductive device and passing substantially only the primary signal voltage frequency, an amplifier connected to said filter and amplifying the primary signal voltage from said filter, a frequency doubler rectifier connected to said buffer amplifier and producing a voltage having a frequency the same as the primary signal frequency, a phase discriminator connected to said amplifier and to said frequency doubler rectifier and arranged to discriminate between the phases of the primary signal voltage and the frequency doubler voltage, a two-phase motor having one of its phases connected electrically to a power source of relatively low frequency, said motor being connected mechanically to said receiver inductive device to drive said receiver inductive device to agreement with said transmitter inductive device, and a magnetic amplifier responsive to the output of said phase discriminator and connecting the other motor phase to the low frequency power source and controlling operation of said motor.

9. In an earth inductor compass, a motor connected electrically to a power source having a frequency of approximately four hundred cycles per second, a transmitter inductive device, an oscillator producing a voltage having a frequency of approximately five kilocycles per second to excite said transmitter inductive device, a receiver inductive device associated with said transmitter inductive device and producing a signal voltage when in disagreement therewith and having a frequency primarily twice the frequency of the exciting voltage, a filter connected to said receiver and passing substantially only the primary signal voltage frequency, a voltage amplifier connected to said filter and amplifying the filtered signal voltage, a frequency doubler rectifier responsive to the exciting voltage frequency from said oscillator and producing a voltage having a frequency the same as the filtered signal voltage, a phase discriminator connected to said voltage amplifier and to said frequency doubler rectifier and discriminating between the phases of said filtered signal voltage and said rectifier voltage, a magnetic amplifier responsive to the output of said phase discriminator and connecting said motor to the power source and controlling operation of said motor, said motor being connected mechanically to said receiver inductive device to drive said receiver inductive device into agreement with said transmitter inductive device.

CORLES M. PERKINS.
ALAN M. MacCALLUM.

REFERENCES CITED

The following references are of record in the file of this patent:

UNITED STATES PATENTS

| Number | Name | Date |
| --- | --- | --- |
| 2,399,695 | Satterlee | May 7, 1946 |
| 2,435,926 | Krupick | Feb. 10, 1948 |
| 2,479,105 | Emerson | Aug. 16, 1949 |